United States Patent [19]

Steer

[11] Patent Number: 4,510,753
[45] Date of Patent: Apr. 16, 1985

[54] MASTER CYLINDER

[75] Inventor: John E. Steer, South Bend, Ind.

[73] Assignee: Allied Corporation, Morristown, N.J.

[21] Appl. No.: 599,101

[22] Filed: Apr. 11, 1984

Related U.S. Application Data

[63] Continuation of Ser. No. 274,336, Jun. 17, 1981, abandoned.

[51] Int. Cl.³ ............................................. B60T 11/08
[52] U.S. Cl. ...................................... 60/578; 60/588; 60/581; 277/183; 277/189; 403/344
[58] Field of Search ................ 60/562, 574, 578, 581, 60/585, 588, 589; 277/206, 206.1, 181, 166, 178, 223, 183, 189, 197, 221; 403/344

[56] References Cited

U.S. PATENT DOCUMENTS

| 793,623 | 6/1905 | Bowen | 277/221 |
|---|---|---|---|
| 860,369 | 7/1907 | Grundy | 403/344 |
| 2,191,444 | 2/1940 | Fleming | 403/344 |
| 2,306,800 | 12/1942 | Caldwell | 277/189 |
| 2,672,009 | 3/1954 | Hense | 60/578 |
| 4,032,159 | 6/1977 | Zitting | 277/190 |
| 4,128,249 | 12/1978 | Manzini | 60/588 |
| 4,301,653 | 11/1981 | Carre | 60/581 |
| 4,441,320 | 4/1984 | Gaiser | 60/578 |

FOREIGN PATENT DOCUMENTS

| 495503 | 8/1953 | Canada | 277/197 |
|---|---|---|---|
| 0020206 | 12/1980 | European Pat. Off. | 60/574 |
| 0022684 | 1/1981 | European Pat. Off. | 60/578 |
| 819788 | 7/1949 | Fed. Rep. of Germany | 60/588 |
| 68189 | 8/1955 | France | 277/223 |
| 1589081 | 5/1981 | United Kingdom | 60/578 |

Primary Examiner—Abraham Hershkovitz
Attorney, Agent, or Firm—Larry J. Palguta; Ken C. Decker

[57] ABSTRACT

A fast-fill master cylinder (14) includes a housing (26) defining a bore (38) therein having a portion (y) thereof of substantially constant diameter. A primary piston (54) is movably received in the bore portion (y) and a secondary piston (56) is movably received in the remainder of the bore (38). The secondary piston (56) cooperates with the housing (26) to define a secondary variable-volume chamber (62). The primary piston (54) cooperates with the housing (26) and with the secondary piston (56) to define a primary variable-volume chamber (58). The primary piston also cooperates with the housing to define a constant-volume recess (84) circumscribing the piston (54). An annular partition member (94) circumscribes the piston member (54) within the recess (84) to divide the recess (84) into a pair of variable-volume compartments (108, 110). A bore 120 communicates the one compartment (110) with the primary chamber (58). When the piston members (54 and 56) are moved to contract the chambers (58 and 62), the one compartment (110) is also contracted to communicate pressurized liquid to the primary chamber (58) via the bore (120).

2 Claims, 3 Drawing Figures

MASTER CYLINDER

This is a continuation of application Ser. No. 274,336, filed June 17, 1981, now abandoned.

This invention relates to a master cylinder. More specifically, this invention relates to a master cylinder of the quick take-up or fast-fill type wherein a piston member movably cooperates with a housing defining a bore receiving the piston member. The piston member and housing cooperate to substantially define a pair of variable-volume chambers which simultaneously expand or contract in response to movement of the piston member within the bore. One of the pair of variable-volume chambers communicates with a brake system. A flow path communicates the pair of variable-volume chambers. The piston member is movable by an operator input force to contract the pair of variable-volume chambers to communicate pressurized fluid from the one variable-volume chamber to the brake system. Pressurized fluid is simultaneously communicated from the other of the pair of variable-volume chambers to the one variable-volume chamber via the flow path. As a result, a greater volume of pressurized fluid is communicated from the master cylinder to the brake system than the decrease in volume of the one variable-volume chamber.

Accordingly, this invention provides: a master cylinder comprising a housing defining a cylinder bore therein, a piston member movably disposed within a portion of said cylinder bore for reciprocation therein, said piston member sealingly cooperating with said housing to substantially define a pair of variable-volume chambers for holding a fluid, passage means for communicating said pair of variable-volume chambers, said piston member being movable relative said housing to contract said pair of variable-volume chambers and to communicate pressurized fluid from one of said pair of variable volume chambers to the other of said pair of variable-volume chambers.

Fast-fill master cylinders are known which comprise a housing defining a stepped cylinder bore therein. The cylinder bore provides a small diameter portion and a large diameter portion cooperating to define a step on the bore. A stepped piston is movably received in the small diameter bore portion and in the large diameter bore portion. The stepped piston includes a small diameter section received in the small diameter bore portion and sealingly cooperating with the housing to substantially define a first variable-volume chamber communicating with a brake system. The master cylinder may also include a second piston member movably disposed in the small diameter bore portion to sealingly divide the first variable-volume chamber into a pair of variable-volume compartments respectively communicating with a pair of independent brake systems. A large diameter section of the stepped piston is received in the large diameter bore portion and sealingly coooperates with the housing. The large diameter piston section cooperates with the housing and with the small diameter piston section to substantially define a second variable-volume chamber. A fluid flow path communicates the first and second variable-volume chambers. The first piston member is movable in response to an operator input force to simultaneously contract the first and second chambers and to thereby communicate pressurized fluid from the second variable-volume chamber into the first variable-volume chamber. Pressurized fluid is communicated from the first variable-volume chamber to the brake system to effectuate a brake application in response to the operator input force. A greater volume of pressurized fluid is delivered to the brake system than the decrease in volume of the first variable-volume chamber. A check valve may be provided in the fluid flow path to allow fluid flow only toward the first variable-volume chamber from the second variable-volume chamber. Consequently, the master cylinder may include a valve apparatus venting pressurized fluid from the second chamber in response to the occurrence of a determined event signaling the end of a first phase of the brake application. Thereafter, during a second phase of the brake application the operator input force is resisted primarily by the pressurized fluid in the first chamber.

With a master cylinder of the known type described above the housing must be of sufficient size to define the large diameter portion of the stepped bore. The small and large diameter portions of the stepped piston must be substantially concentric. Any significant eccentricity of the small and large diameter bore portions may cause the stepped piston to bind in the stepped bore. Machining of the stepped bore within the housing during manufacture of the master cylinder requires the use of expensive tooling to generate the stepped bore. The small and large diameter sections of the stepped piston must be substantially concentric to avoid binding of the stepped piston within the stepped bore. Manufacturing of the stepped piston requires the use of bar stock having an outer diameter at least as large as the large diameter piston section. A substantial portion of each bar stock work piece which is to become a stepped piston must be machined away to form the small diameter section of the stepped piston.

The invention as claimed is intended to avoid one or more of the shortcomings of prior master cylinders by providing a master cylinder characterized in that said bore portion is of a constant diameter, an annular partition member disposed substantially immovably within said bore portion and circumscribing said piston member, said partition member sealingly cooperating with said housing and with said piston member to bound said one variable-volume chamber.

The advantages offered by the invention are mainly that the housing need be only of sufficient size to define the constant diameter cylinder bore. Because the cylinder bore is of a constant diameter, it presents no bore portion concentricity problems. The constant diameter cylinder bore is simple and inexpensive to generate during manufacture of the master cylinder. Manufacture of the piston member does not require the machining away of large portions of a work piece because the piston is not stepped to cooperate with a stepped bore.

One preferred way of carrying out the invention is described in detail below with reference to drawing figures which illustrate only the one preferred embodiment; in which.

Figure 1:
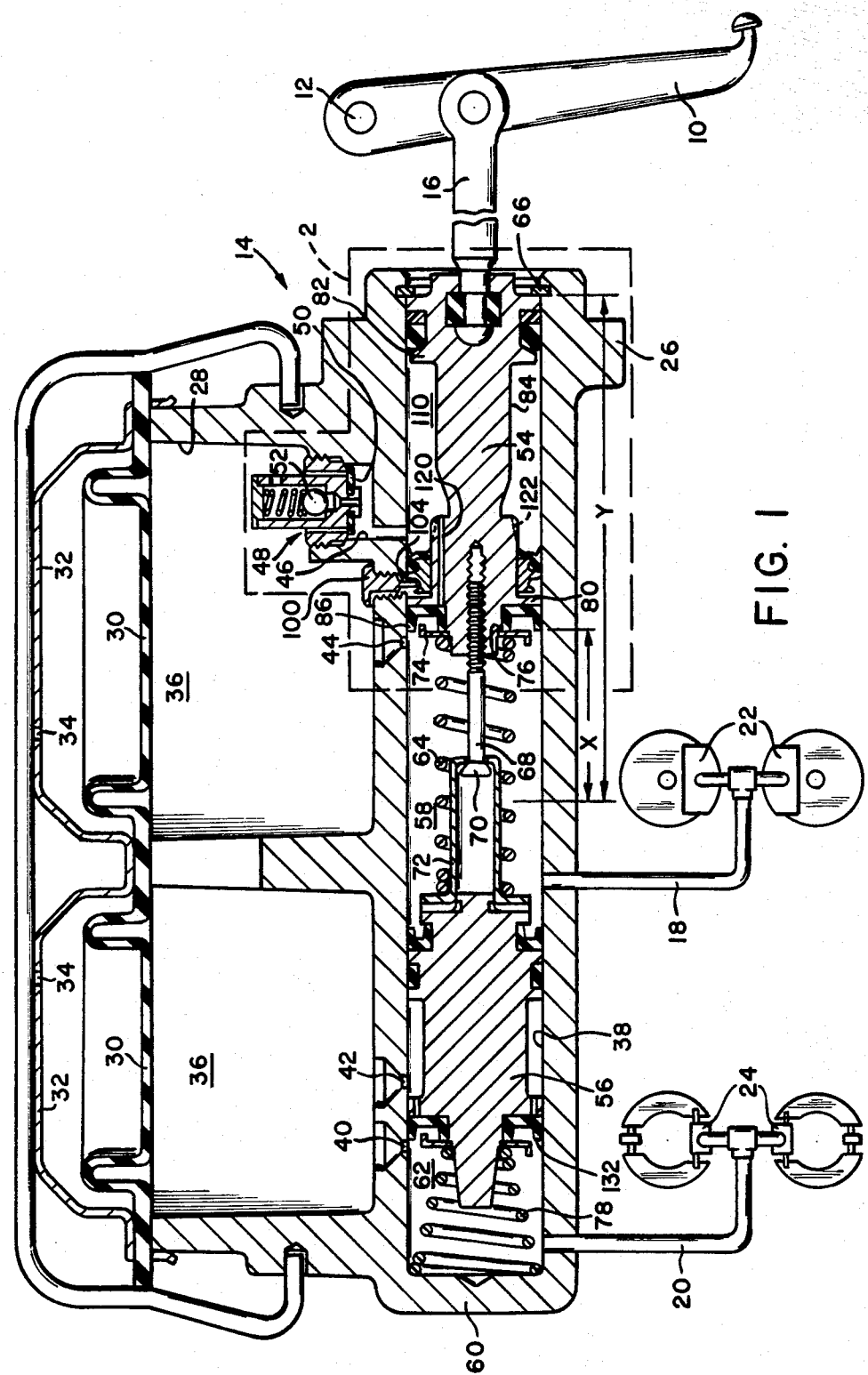
FIG. 1 is a schematic illustration of a brake system including a longitudinal view, partly in cross section, of a master cylinder embodying the invention.
Figure 2:
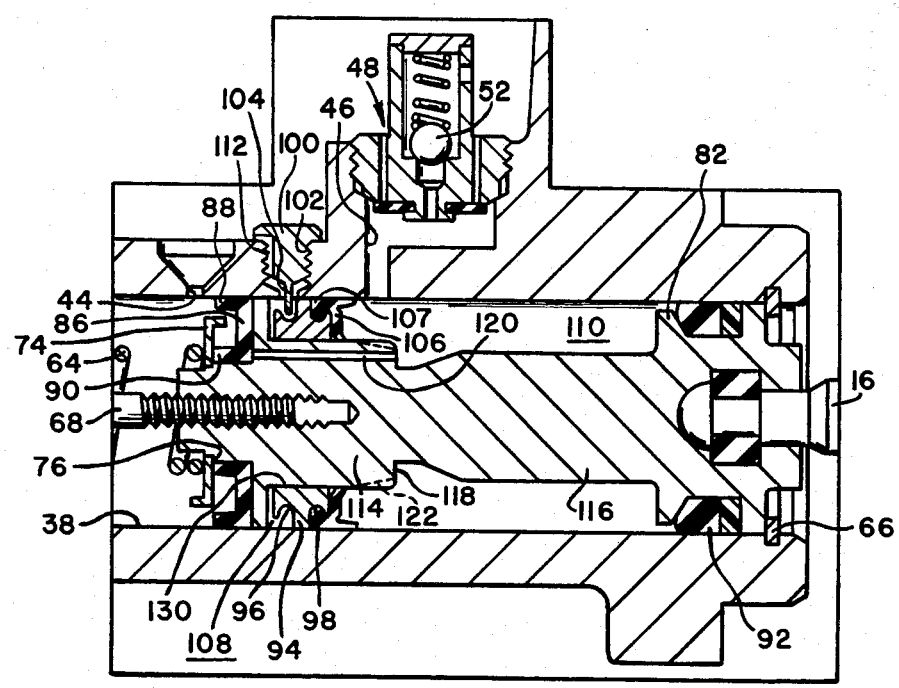
FIG. 2 is an enlarged view of an encircled portion of FIG. 1.

The drawing figures show a brake system having a brake pedal 10 which is pivotally supported by a pin 12. The brake pedal 10 is operationally coupled to a master cylinder 14 by an input rod 16. Conduits 18 and 20 connect the master cylinder 14 to a pair of independent brake systems 22 and 24, respectively. When the brake pedal 10 is forcefully pivoted clockwise by an operator, the input rod 16 is moved into the master cylinder 14 to generate fluid pressure therein. The generated fluid pressure is communicated via conduits 18 and 20 to the respective brake systems 22 and 24 to effectuate a brake application.

The master cylinder 14 includes a housing 26 defining a split recess at 28. A flexible diaphram 30 and a cap 32 cooperate to close the split recess 28. The cap 32 defines a pair of apertures 34 venting the upper surface of the diaphram 30 to atmospheric pressure. Consequently, the diaphram 30 and cap 32 cooperate with the housing 26 to define a split reservoir 36 for holding a liquid at substantially ambient pressure.

The reservoir 36 communicates with a bore 38 via ports or openings 40, 42, 44 and 46. A valve apparatus 48 is received in the opening 46. The valve apparatus 48 includes an annular flap valve element 50 which allows fluid flow only toward the bore 38 in response to a fluid pressure differential across the flap valve. The valve apparatus 48 also includes a spring loaded relief valve element 52 which allows fluid flow only out of the bore 38 in response to a determined fluid pressure level therein.

A primary piston 54 is coupled to the input rod 16 and is received in the bore 38 along with a secondary piston 56. The primary piston 54 cooperates with the secondary piston 56 to substantially define a primary variable-volume chamber 58 therebetween. Similarly, the secondary piston 56 cooperates with an end wall 60 of the bore 38 to substantially define a secondary variable-volume chamber 62. The primary chamber 58 communicates with the brake system 22 via the conduit 18. Similarly, the secondary chamber 62 communicates with the brake system 24 via the conduit 20. A first return spring 64 biases the primary piston 54 rightwardly into engagement with a retaining ring 66 to define a nonbraking position for the piston 54. The primary piston 54 carries a spring cage including a stem 68 having a head 70. The spring cage also includes an annular cup-shaped spring seat 72 which is movably carried upon the stem 68. The first return spring 64 extends between the spring seat 72 and an annular retainer 74 seating on a shoulder 76 on the primary piston 54 to bias the spring seat 72 into engagement with the secondary piston 56. The spring seat 72 is engageable with the head 70 to define nonbraking relative positions for the primary and secondary pistons 54 and 56. A second return spring 78 extends between the end wall 60 of the housing 26 and the secondary piston 56 to bias the secondary piston rightwardly. Because the spring rate and/or preload of the spring 64 is greater than that of the spring 78, the spring seat 72 normally engages the head 70 to define a nonbraking position for the secondary piston 56.

The primary piston 54 defines a pair of axially spaced radially extending lands 80 and 82 which define an annular recess 84 therebetween. The land 80 supports an annular elastomeric lip seal 86 which includes a pair of radially spaced axially extendinglips 88 and 90. The radially outer lip 88 sealingly engages the housing 26 while the radially inner lip 90 sealingly engages the primary piston 54. The land 82 carries an annular elastomeric sealing member 92 which sealingly engages the housing 26. An annular partition member 94 circumscribes the primary piston 54 within the recess 84. The partition member 94 defines a pair of radially outwardly facing annular recesss 96 and 98. A retaining member 100 threadably engages a bore 102 in the housing 26 and includes a cylindrical protrusion 104 extending radially inwardly into the bore 38. The protrusion 104 is received in the recess 96 to substantially immovably secure the partition member 94 within the bore 38. An annular sealing member 106 includes an annular bead 107 which is snapped into the other recess 98. The sealing member 106 sealingly cooperates with the primary piston 54 and with the housing 26 to divide the recess 84 into a pair of variable-volume compartments 108 and 110. The compartment 110 communicates with the reservoir 36 via port 46 while the compartment 108 communicates with the reservoir via a notch 112 interrupting the screw threads of the retaining member 100. The recess 84 on the primary piston 54 includes a large diameter portion 114 and a small diameter portion 116 which are separated by an annular rabbet 118. A bore 120 extends axially through the land 80 and large diameter portion 114 of the primary piston 54. The bore 120 communicates at its left end with the lip seal 86 and leads from the lip seal 86 into the rabbet 118. The large diameter portion 114 of the primary piston 54 also defines a multitude of axially extending and axially tapering grooves 122 which lead to the rabbet 118.

Figure 3:
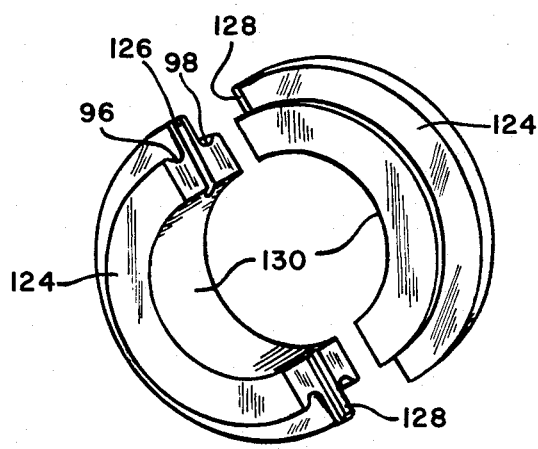
FIG. 3 is an isolated perspective view of a pair of component parts of the master cylinder illustrated in FIGS. 1 and 2.

FIG. 3 illustrates that the partition member 94 comprises a pair of C-shaped members 124 which are identical. The C-shaped members 124 each have a radially extending groove 126 on one of their ends and a radially extending tongue 128 on the other end. Consequently, the members 124 interlock with one another via the tongues 128 and grooves 126 and cooperate to define a bore 130 for receiving the primary piston 54.

When a brake application is effected, the brake pedal 10 is forcefully pivoted clockwise by a vehicle operator. The operator input force is transferred by the input rod 16 to the primary piston 54, shifting the primary piston leftwardly in the bore 38. During an initial phase of a brake application, leftward movement of the primary piston 54 from its nonbraking position contracts the compartment 110 so that fluid is displaced from the compartment 110 into the chamber 58 via the bore 120 and past the lip seal 86. Initial fluid displaced into the chamber 58 is vented to the reservoir via the port 44. Because the spring rate and/or preload of the first return spring 64 is greater than that of the second return spring 78, the primary piston 54 and secondary piston 56 simultaneously move leftwardly from their nonbraking positions. Consequently, the lip seal 86 on the primary piston 54 and a similar lip seal 132 on the secondary piston 56 move leftwardly across the ports 44 and 40, respectively, to substantially simultaneously trap fluid in the chambers 58 and 62 to begin a first phase of a brake application. Thereafter, continuing leftward movement of the primary piston 54 pressurizes fluid in the chamber 58 and in compartment 110. The pressurized fluid in the compartment 58 and contraction of first return spring 64 moves the secondary piston 56 further leftwardly to pressurize fluid in the chamber 62.

During the first phase of a brake application, continuing leftward movement of the primary piston 54 displaces fluid from the compartment 110 into the chamber 58 via the bore 120 and lip seal 86. While the fluid pressure levels in the two chambers 58 and 62 are substantially the same, allowing for seal friction and the differing rates of the return springs, the extent of movement of the primary and secondary pistons from their nonbraking relative positions depends upon the fluid absorption of the brake systems 22 and 24 at the respective fluid pressures prevailing in the chambers 58 and 62.

A second phase of a brake application may be begun by the first to occur of two events explained infra. One of the two events is the ocurrence of a fluid pressure in the compartment 110, and in the chamber 58 allowing for the pressure drop created by the lip seal 86, exceeding the determined pressure necessary to open the relief valve 52. If the determined pressure is reached in the compartment 110, the relief valve opens to vent the compartment 110 to the reservoir 36. Thereafter, the operator input force acting on the primary piston 54 is opposed only by the fluid pressure in the chamber 58 and by the fluid pressure at the determined pressure in the compartment 110. Consequently, the operator input force may pressurize the fluid in the chamber 58 to a higher level.

The other of the events which may commence a second phase of a brake application is the leftward movement of the primary piston 54 to a position wherein the grooves 122 move under the seal 106. The grooves 122 communicate pressurized fluid from the compartment 110 to the compartment 108 to reduce the fluid pressure in the former. The compartment 108 communicates with the reservoir 36 via the notch 112 so that the fluid pressure in the compartment 110 is eventually reduced to atmospheric pressure. Because the grooves 122 taper axially and because their shallow ends first move under the seal 106, fluid communication from the compartment 110 to the compartment 108 begins very gradually and increases as a function of leftward movement of the primary piston 54. Consequently, the vehicle operator does not experience a substantial transition bump between the first and second phases of a brake application. A transition bump would be manifest by a rapid clockwise pivotal movement of the brake pedal 10 without a commensurate increase in operator input force. Such a transition bump is disconcerting to a vehicle operator because it may give the impression that the brake system is failing. Further, such a disconcerting transition bump is undesirable because it may interfere with the operator's modulation of the operator input force.

Those brake applications which have their second phase started by the opening of the relief valve 52 may endure sufficiently for leftward movement of the piston 54 to move the notches 122 under the sealing member 106. Moreover, every brake application may include a period of time during which the compartment 110 is at atmospheric pressure not-withstanding the event which signaled the beginning of the second phase of the brake application. In either event, a transition bump between the first and second phases is substantially avoided because the fluid pressure in the compartment 110 is constant at the determined pressure or is gradually reduced from a lower pressure at the transition.

An examination of FIG. 1 will reveal that the primary piston 54 is capable of moving from its nonbraking position leftward into the bore 38 through a distance x. Consequently, the portion of the bore 38 within which the piston 54 is movably received is delimited by the arrow y. The portion of the bore 38 delimited by the arrow y is substantially constant in diameter, allowing for any taper or irregularity which may inadvertently occur during manufacture of the master cylinder 14. Further, it will be noted that the small diameter portion 116 of the piston 54 is sufficiently smaller in diameter than the portion 114 that the sealing member 106 can not sealingly engage the portion 116. As a result, pressurized fluid can not be developed in the compartment 110 after the piston 54 moves the rabbet 118 leftwardly of the sealing member 106. For example, the piston 54 may move the rabbet 118 leftwardly of the sealing member 106 during a brake application with one of the conduits 18 or 20 breached. During such a brake application, the development of pressurized fluid in the compartment 110 after the first phase of the brake application is undesirable because the operator input force would be resisted by the pressurized fluid.

I claim:

1. A master cylinder comprising a housing defining a cylinder bore therein, a piston member movably diposed within a portion of said cylinder bore for axial reciprocation therein, said piston member sealingly cooperating with said housing to bound a pair of variable-volume chambers for holding a fluid, passage means for communicating said pair of variable-volume chambers, said piston member being movable relative said housing to contract said pair of variable-volume chambers and to communicate pressurized fluid from one of said pair of variable-volume chambers to the other of said pair of variable-volume chambers, means cooperating with said piston to provide for contraction of said one variable-volume chamber when said piston is movable relative to said housing, characterized in that said bore portion is of a constant diameter, said means comprising an annular partition member disposed substantially immovably within said bore portion and circumscribing said piston member, said partition member sealingly cooperating with said housing and with said piston member via a sealing member to bound said one variable-volume chamber, with said partition member including a pair of identical C-shaped members which each include cooperating means for interlocking with the other and said pair of C-shaped members cooperating with said sealing member to form coacting means for interlocking said C-shaped members with said sealing member, said cooperating means includes a radially extending tongue defined at one end of said C-shaped members and a radially extending groove defined at the opposite end of said C-shaped members, said groove of each C-shaped member receiving the tongue of the other C-shaped member to axially interlock therewith and prevent axial movement between said pair of identical C-shaped members.

2. The invention of claim 1, wherein said coacting means includes a radially outwardly facing annular recess defined by said C-shaped member and an annular bead defined by said sealing member, said annular recess receiving said annular bead to oppose radial and axial separation between said pair of identical C-shaped members.

* * * * *